(12) United States Patent
Altimas et al.

(10) Patent No.: US 8,342,970 B2
(45) Date of Patent: Jan. 1, 2013

(54) DRIVE SHAFT UNIVERSAL JOINT ASSEMBLY WITH RADIAL ELLIPTICAL PROJECTIONS

(75) Inventors: Gregory Richard Altimas, Nisku (CA); Rishi Shankar Gurjar, Nisku (CA)

(73) Assignee: Precision Energy Services, Inc., Fort Worth, TX (US)

( * ) Notice: Subject to any disclaimer, the term of this patent is extended or adjusted under 35 U.S.C. 154(b) by 2 days.

(21) Appl. No.: 13/017,805

(22) Filed: Jan. 31, 2011

(65) Prior Publication Data

US 2012/0196690 A1 Aug. 2, 2012

(51) Int. Cl.
*F16D 3/18* (2006.01)

(52) U.S. Cl. .......................................... 464/120; 464/156

(58) Field of Classification Search .................. 464/115, 464/120, 125, 155, 156, 159, 904, 905
See application file for complete search history.

(56) References Cited

U.S. PATENT DOCUMENTS

| | | | |
|---|---|---|---|
| 2,150,942 A | 3/1939 | Rzeppa | |
| 2,319,100 A | 5/1943 | Anderson | |
| 3,732,706 A * | 5/1973 | Evans | 464/155 X |
| 3,818,721 A | 6/1974 | Wahlmark | |
| 4,772,246 A | 9/1988 | Wenzel | |
| 4,786,270 A | 11/1988 | Iwasaki | |
| 4,904,228 A | 2/1990 | Frear et al. | |
| 4,982,801 A | 1/1991 | Zitka et al. | |
| 5,000,723 A | 3/1991 | Livingstone | |
| 5,048,622 A | 9/1991 | Ide | |
| 5,078,650 A | 1/1992 | Foote | |
| 5,205,789 A | 4/1993 | Falgout, Sr. | |
| 5,267,905 A | 12/1993 | Wenzel et al. | |
| 5,288,271 A | 2/1994 | Nelson et al. | |
| 5,704,838 A | 1/1998 | Teale | |
| 6,871,719 B2 * | 3/2005 | Breese et al. | 464/159 X |
| 6,949,025 B1 | 9/2005 | Kraus et al. | |
| 7,052,400 B2 * | 5/2006 | Kura et al. | 464/905 |
| 7,186,182 B2 | 3/2007 | Wenzel et al. | |
| 7,611,415 B1 | 11/2009 | Uchman | |
| 7,624,819 B1 | 12/2009 | LeBlanc et al. | |
| 7,695,371 B2 | 4/2010 | Kawakatsu et al. | |
| 8,033,917 B2 | 10/2011 | Prill et al. | |
| 2003/0186750 A1 * | 10/2003 | Toelle | |
| 2009/0275415 A1 | 11/2009 | Prill | |
| 2010/0093452 A1 | 4/2010 | Kim | |
| 2010/0190561 A1 | 7/2010 | Falgout | |

OTHER PUBLICATIONS

Universal Joint and Driveshaft Design Manual, AE-7, Society of Automotive Engineers, Inc., Warrendale, PA, pp. 99-101, TJ1079. S62 1979.*
"Constant-velocity joint," webpage printed from https://en.wikipedia.org/wiki/Constant-velocity_joint, dated May 2, 2012, 5 pages.
"Universal joint,", webpage printed from https://en.wikipedia.org/wiki/Wuniversal_joint, dated May 2, 2012, 6 pages.

* cited by examiner

*Primary Examiner* — Gregory Binda
(74) *Attorney, Agent, or Firm* — Wong, Cabello, Lutsch, Rutherford & Brucculeri, LLP (57) ABSTRACT

A driveshaft assembly includes a driveshaft with a pair of universal joints disposed at each end of the driveshaft. Each of the universal joints provides torque transfer from the driveshaft to an adapter disposed to driveshaft using a plurality of elliptical projections that mate with interior grooves of the adapter. Stress concentration on the projections may be reduced in some embodiments by providing a variable radius fillet around each of the projections at the intersection of the projection with the driveshaft.

10 Claims, 9 Drawing Sheets

SECTION A-A

DRIVE SHAFT UNIVERSAL JOINT ASSEMBLY WITH RADIAL ELLIPTICAL PROJECTIONS

TECHNICAL FIELD

The present invention relates to the field of universal joints, and in particular to a universal drive joint for torque transfer with radial elliptical projections.

BACKGROUND ART

The oil and gas industry is constantly striving to reduce drilling costs. One method of reducing cost is to increase drilling rates by increasing torque at bit. Recently, torque available at bit has increased significantly, with the advancement of directional drilling motor power section technology. This advancement has introduced the need for drive joint technology to sustain high torsional loading.

In the past, manufacturers of universal drive joints have increased torsional rating by using various joint configurations with higher-grade materials and improved case hardness. Many designs exist and various methods are used to transmit the torsional loads from one part to the other. Conventional drive joints have been developed using balls, bullets, keys, and involute splines to transfer torque.

The rotary output rotor of conventional downhole positive displacement motors employed downhole as a drilling motor may be eccentric with respect to the axis of the drill string and the input member of a bearing assembly to which the rotor must be secured. Accordingly, a driveshaft having universal joints at each end is commonly employed to connect the output member of the motor to the input member of the bearing assembly.

A common conventional driveshaft assembly with universal drive joints comprises a driveshaft that is coupled to an adapter placed over the driveshaft. A ball and seat arrangement serves to maintain the engagement of the adapter with the driveshaft. The adapter comprises a plurality of cylindrical slots formed in the interior surface of the adapter that engage balls positioned in spherical dimples in the driveshaft that are positioned circumferentially around an end of the driveshaft.

The spherical holes in the conventional driveshaft result in significant stress concentration that leads to fatigue failure well below the static drive strength. This failure has limited the ability to drill with new power section technology.

SUMMARY OF INVENTION

Various embodiments disclosed herein replace the balls with elliptical radial projections on the driveshaft that engage with the slots formed in the adapter. Torsional load transfer occurs between the elliptical projections and the cylindrical slots, creating a larger contact patch compared to the conventional ball design.

In one embodiment, a large variable radius fillet is included at the intersection between the elliptical projection and the driveshaft outer surface, reducing stress concentration, and thus fatigue failures.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
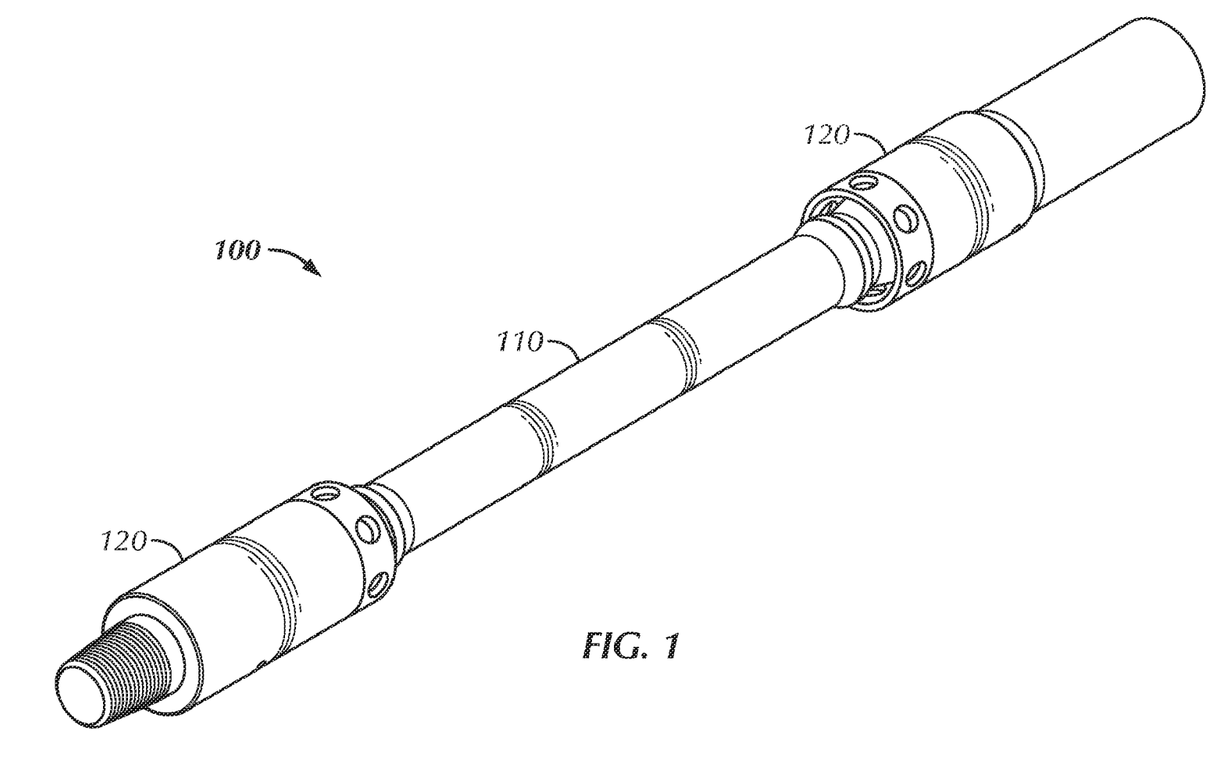
FIG. 1 is an isometric view illustrating a driveshaft assembly according to one embodiment.

In one embodiment, illustrated in isometric view in FIG. 1, a driveshaft assembly 100 comprises a driveshaft 110 and adapters 120 on each end of the driveshaft 110. As illustrated in FIG. 1, one of the adapters 120 is box threaded for connection to another drive element (not shown) and the other adapter 120 is pin threaded for a similar connection. Some embodiments may use a pair of box-threaded adapters 120, while other embodiments may use a pair of pin-threaded adapters 120, as desired. In yet another embodiment, a single-ended driveshaft assembly may employ only one adapter 120 at one end, using another type of connection at the other end. The adapters 120 are conventional adapters used to provide universal joints in driveshaft assemblies, and are not described in detail in the present application. In addition, the driveshaft assembly may comprise other conventional elements, including seals and mechanisms for transmitting tensile and compressive axial load, that will be known to one of skill in the art and are not detailed herein.

Figure 2:
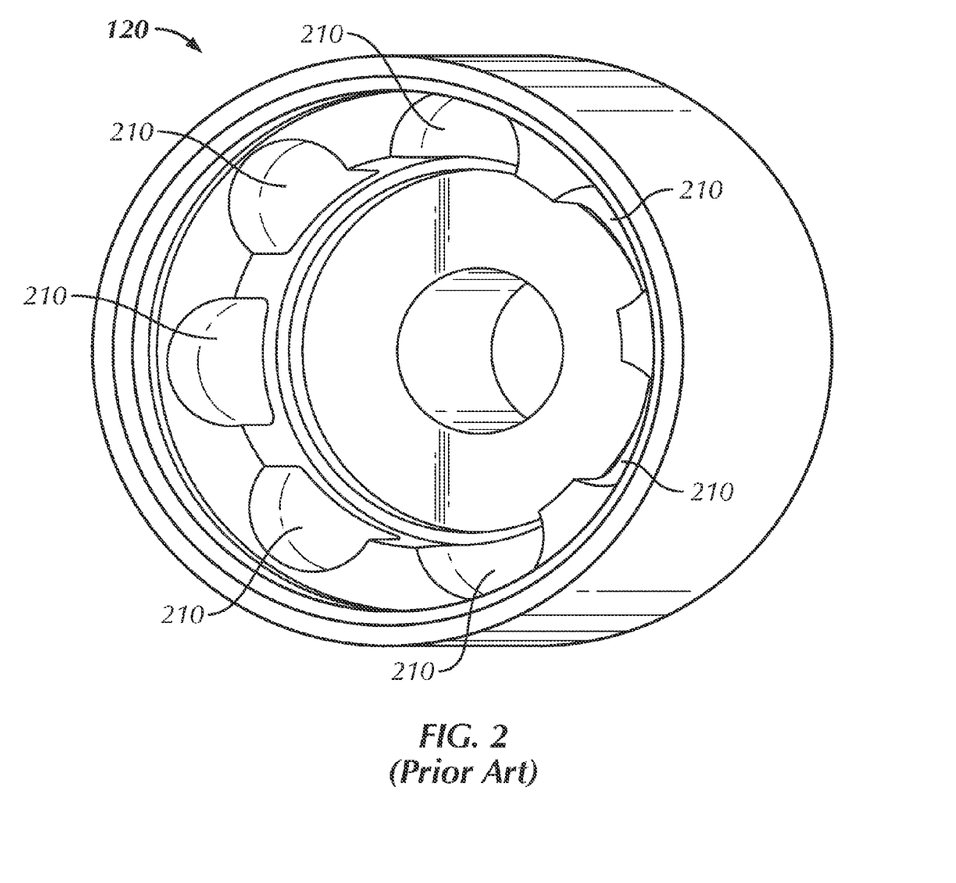
FIG. 2 is a perspective view illustrating an adapter of the driveshaft assembly of FIG. 1.

An example prior art adapter 120 is illustrated in FIG. 2 in perspective view. The adapter 120 has a plurality of cylindrical slots or grooves 210, which mate with features of the driveshaft for torque transfer. The slots 210 are formed on the interior surface of the adapter 120. Although seven slots 210 are illustrated in FIG. 2, any desired number of slots 210 may be used. In a conventional driveshaft assembly, such as described above, the diameter of the balls mounted in the driveshaft are sized to correspond to the diameter of the cylindrical slots 210.

Figure 3:
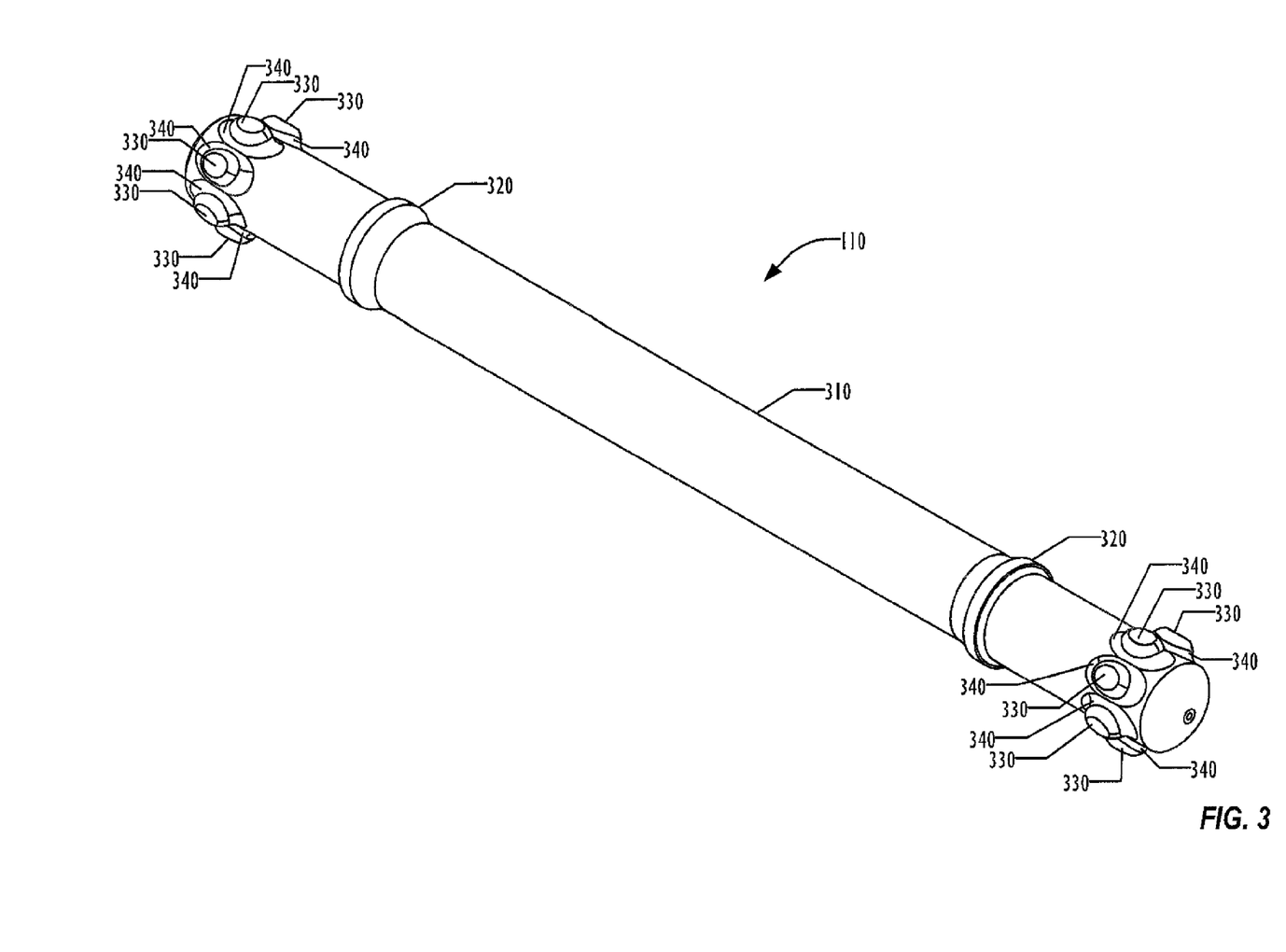
FIG. 3 is an isometric view illustrating a driveshaft of the driveshaft assembly of FIG. 1.

FIG. 3 is an isometric view illustrating a driveshaft 110 according to one embodiment. The driveshaft 110 comprises a cylindrical body 310. Mounting sections for attaching seals 320 are formed near either end of the driveshaft 110. Between the mounting sections 320 and the corresponding end of the driveshaft 110, a plurality of projections 330 are formed, extending radially from the surface of the cylindrical body 310, that mate with the slots 210 of the adapters 120 for torque transfer in a universal joint.

In one embodiment, the plurality of projections 330 are machined from a larger diameter initial body, typically using a computer numerical controlled (CNC) machine tool. Other techniques for forming the projections may be used as desired, including forming each projection separately and attaching it to or inserting it into the cylindrical body 310, as desired.

Each of the projections 330 has an elliptical cross-section, and is sized to correspond to the size of the grooves 210 of the adapter 120. Torsional load transfer occurs between the elliptical surfaces of the projections 330 and the cylindrical surfaces of the slots 210 of the adapters 120, creating a larger contact area than in a conventional design using balls placed in dimples in the driveshaft.

In one embodiment, additional stress concentration reduction can be achieved by including variable radius fillets 340 around the base of each projection 330, where the projections 330 intersect the cylindrical body 310, as illustrated in FIG. 3.

Figure 4:
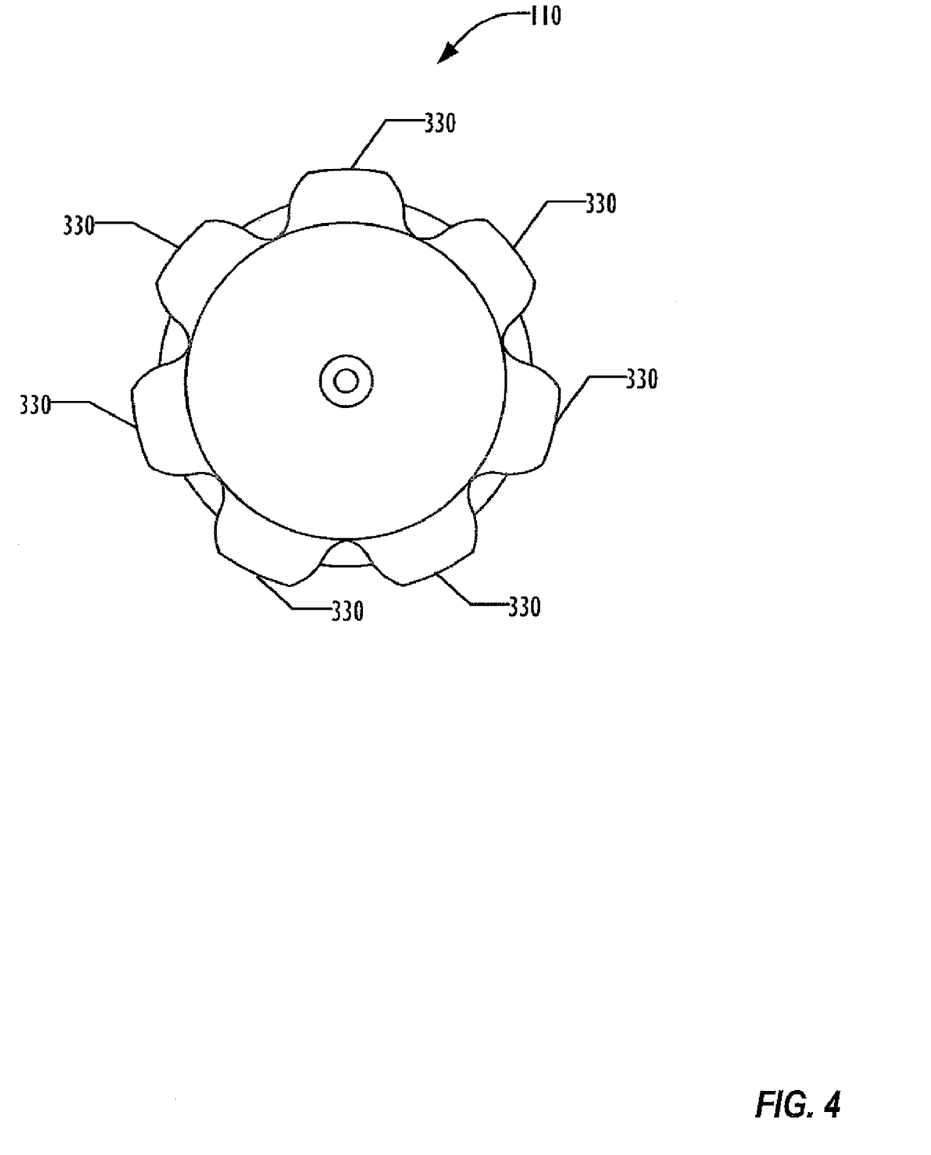
FIG. 4 is an end view illustrating the driveshaft of FIG. 3.

FIG. 4 is an end view illustrating the driveshaft 110 according to one embodiment, illustrating that each projection 330 is substantially flat at the end of the projection 330 radially distal from the cylindrical body 310, and that the projections 330 extend beyond the diameter of the mounting section 320. These flats may allow compatibility with existing adapters 120 and other conventional drive shaft assembly elements. In other embodiments, the projections 330 may be made with elliptical radial end surfaces instead of flats.

Figure 5:
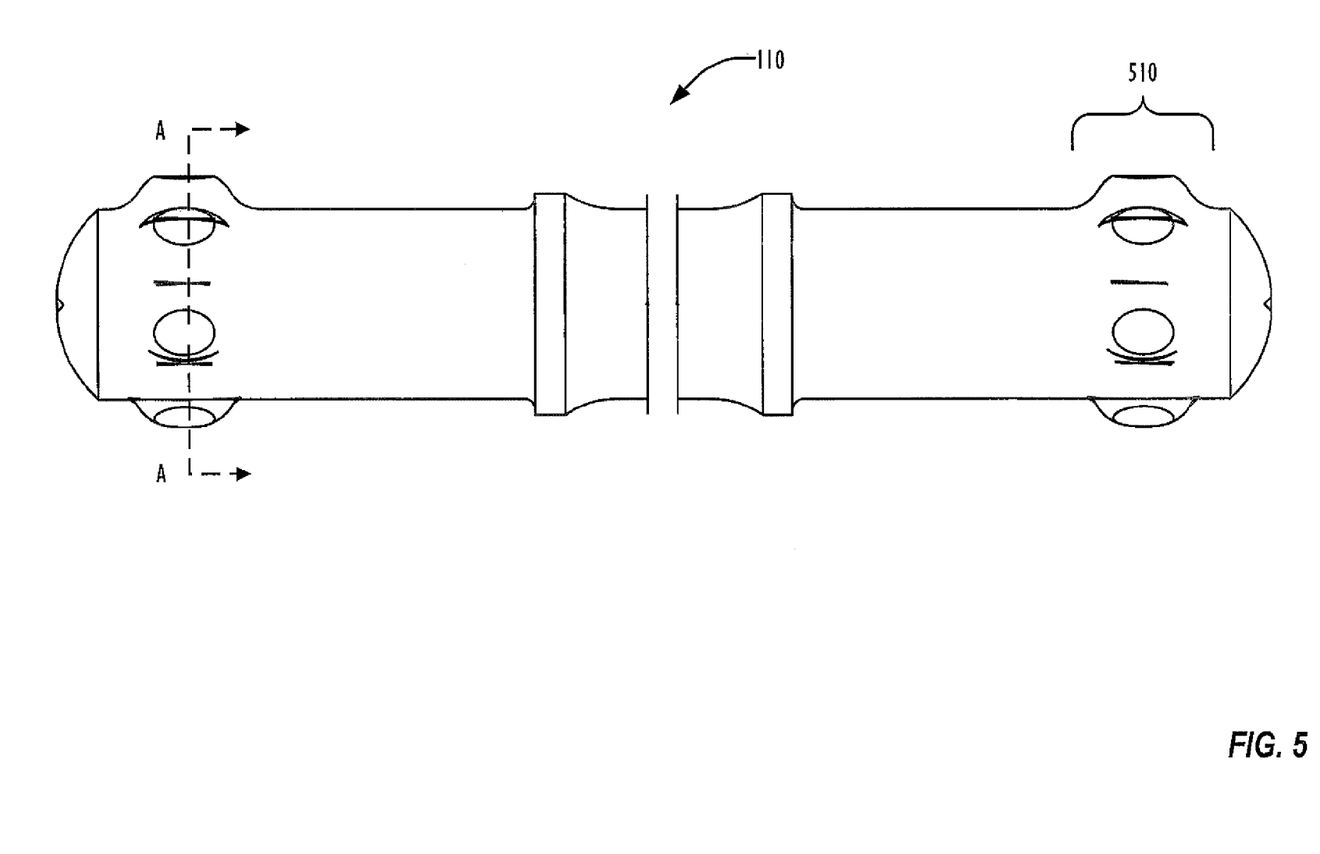
FIG. 5 is a side elevation view illustrating the driveshaft of FIG. 3.

FIG. 5 is a side elevation view illustrating the driveshaft 110, illustrating the variable radius of the fillet 340 that surrounds the base of each projection 330. In one embodiment, the fillet 340 is machined by the CNC during the machining that forms the projections 330. In another embodiment, the fillets 340 are formed after the machining of the projections 330 using any desired technique, including welding.

In one embodiment, the driveshaft 110 is machined from a NiCrMoV hardened and tempered high strength alloy steel used for applications in the oil, gas and aerospace industries, typically designated as a 4330 V steel. Other materials, including a low alloy, vacuum melted, steel of very high strength, typically designated as a 300 M steel, may be used as desired.

Figure 6:
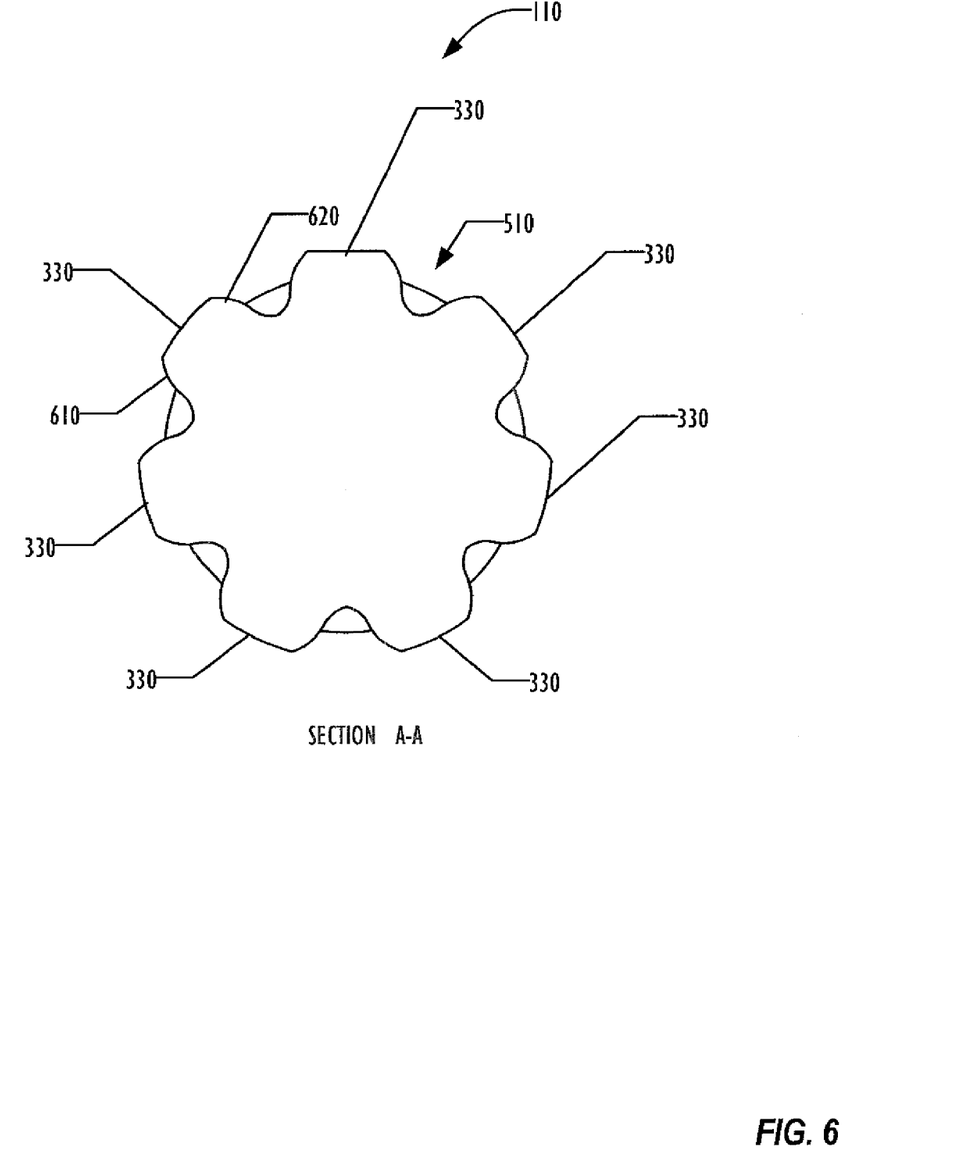
FIG. 6 is a cross-sectional illustrating the radial projections of the driveshaft of FIG. 3.

In one embodiment, the surface 510 around each of the projections 330 is treated with a shot peening and phosphating process. FIG. 6 is a cross-sectional view illustrating a cross-section of the driveshaft 110 along line A-A. As illustrated in FIG. 6, the shot peening and phosphating process treats the surface of the driveshaft 110 between the projections 330 to enhance fatigue life. In addition, in one embodiment laser hardening may be used to harden a leading surface of each projection in area 610, enhancing wearability. A trailing surface 620 may also be hardened using laser hardening as desired. In other embodiments, other finish treatment techniques may be used, including flame hardening.

Comparison testing of conventional driveshafts that use balls for torque transfer and driveshafts according to the embodiment described above has shown that driveshafts manufactured according to the embodiment described above can sustain many times the number of cycles of use than the conventional driveshafts.

Figure 7:
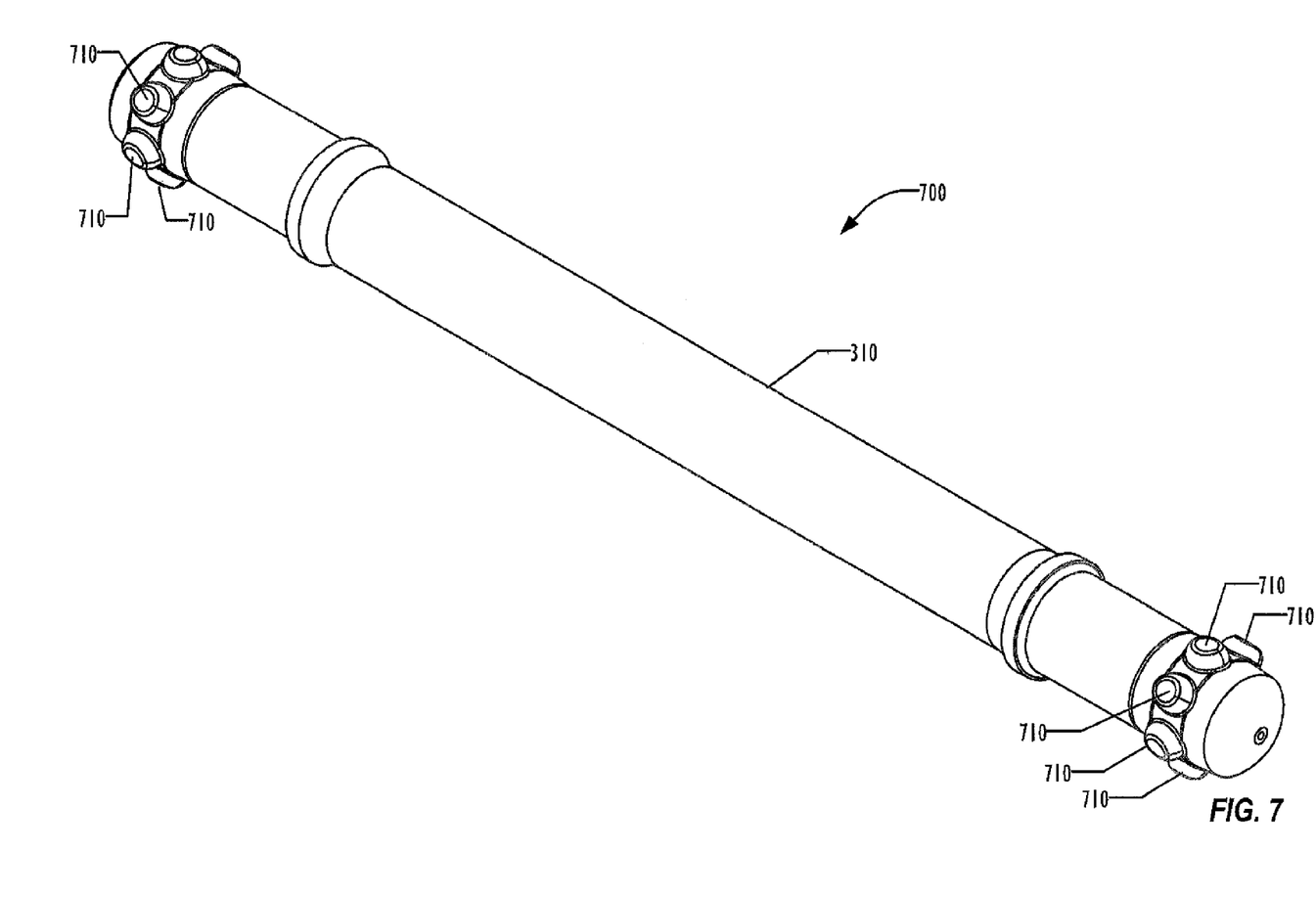
FIG. 7 is an isometric view illustrating a driveshaft according to another embodiment.
Figure 8:
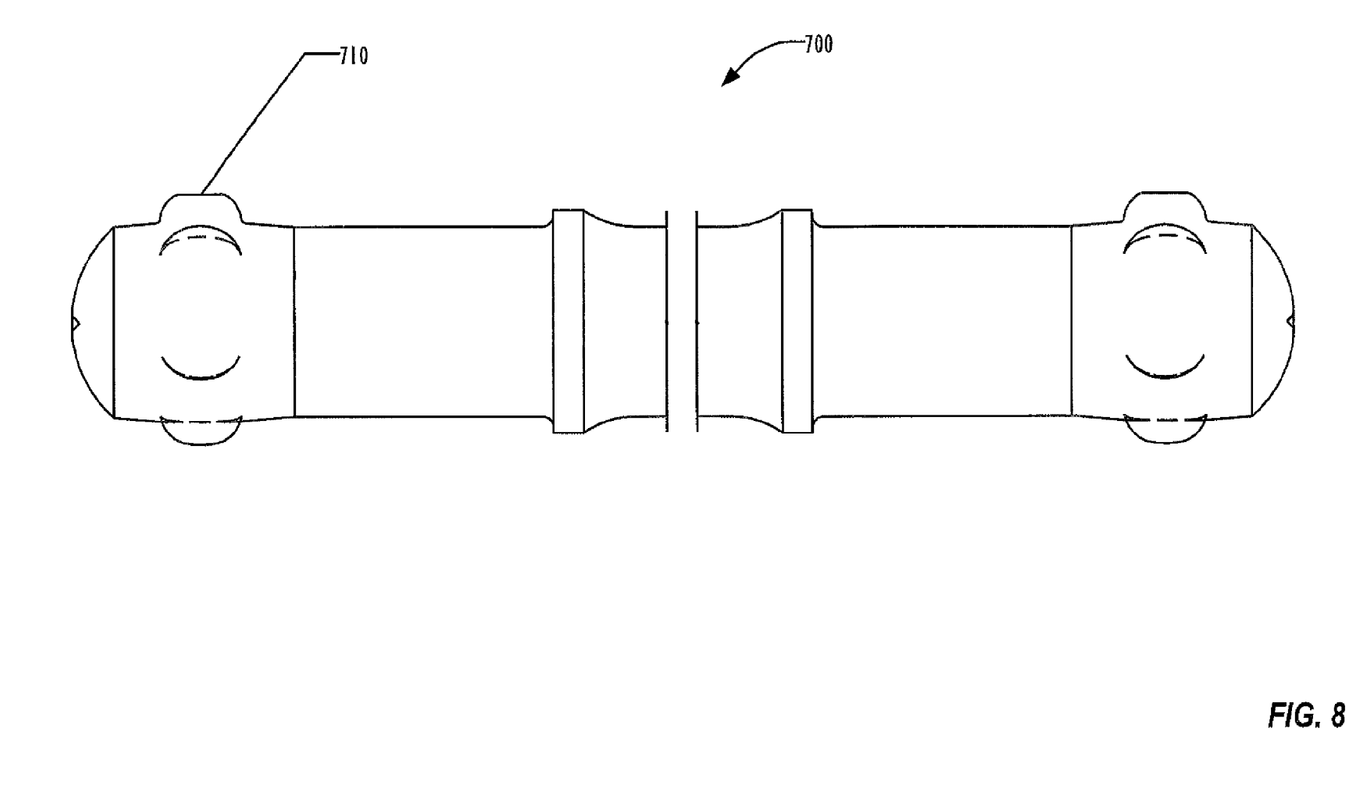
FIG. 8 is a side elevation view illustrating the driveshaft of FIG. 7.
Figure 9:
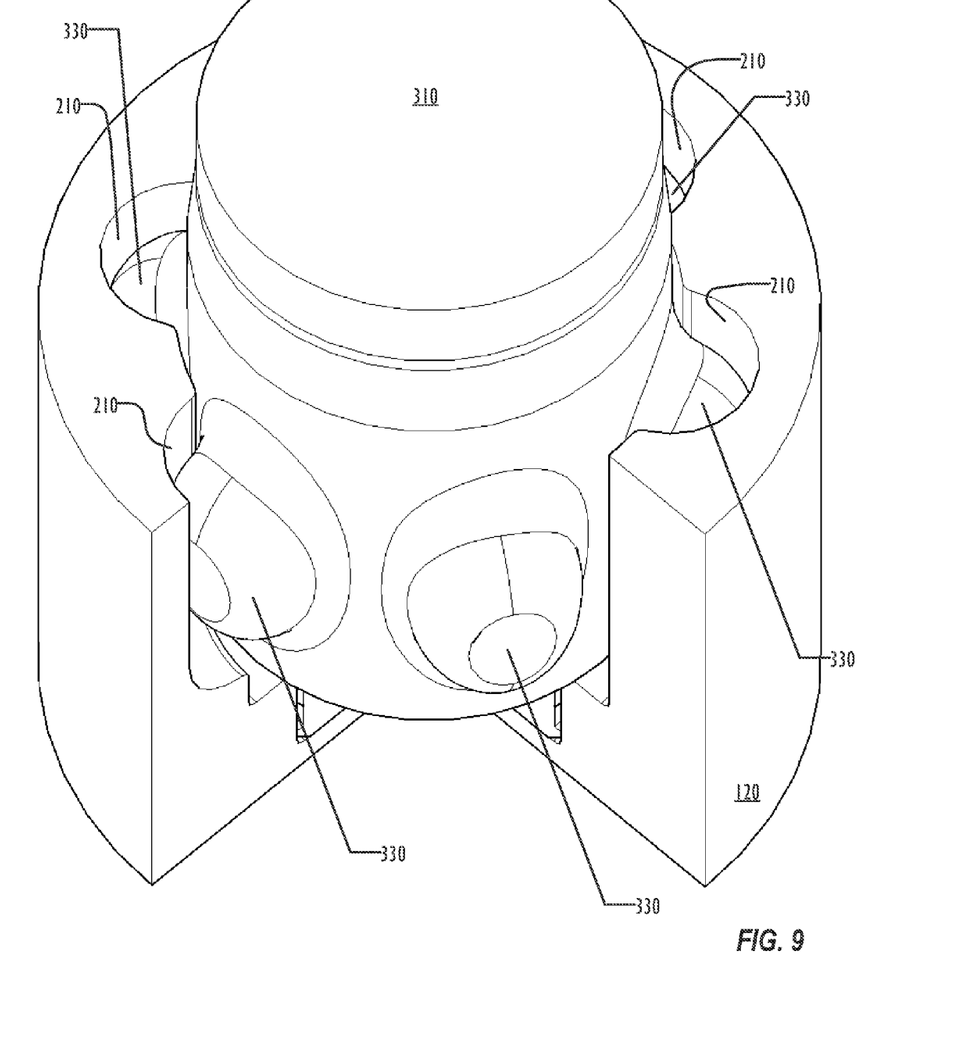
FIG. 9 is a cutaway view of a driveshaft assembly illustrating the driveshaft of FIG. 3 assembled with the adapter of FIG. 2.

FIG. 7 is an isometric view illustrating a driveshaft 700 according to another embodiment. The driveshaft 700 is identical to the driveshaft 110 illustrated in FIG. 3, except that instead of the projections 330 surrounded by a variable radius fillet 340, as illustrated in FIG. 3, the driveshaft 700 employs the cylindrical body 310 with elliptical projections 710 that do not have a surrounding fillet. FIG. 8 is a side elevation view illustrating the driveshaft 700 of FIG. 7, further illustrating the configuration of the projections 710.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A universal joint, comprising:
a cylindrical body;
a plurality of radially elliptical projections extending radially from an outer surface of the cylindrical body, spaced about the circumference of the cylindrical body; and
an adapter having a plurality of cylindrical interior grooves formed parallel to a longitudinal axis of the adapter, disposed over the plurality of radially elliptical projections, wherein each of the plurality of radially elliptical projections directly mates with one of the plurality of cylindrical interior grooves.

2. The universal joint of claim 1, wherein each of the plurality of elliptical projections is flattened at a surface radially distal from the cylindrical body.

3. The universal joint of claim 1, wherein each of the plurality of elliptical projections is surrounded by a variable radius fillet at an intersection between the projection and the outer surface of the cylindrical body.

4. The universal joint of claim 1, wherein an area of the cylindrical body surrounding each of the plurality of elliptical projections is shot peened.

5. The universal joint of claim 1, wherein a leading face of each of the plurality of elliptical projections is laser hardened.

6. A driveshaft assembly, comprising:
a driveshaft;
a pair of universal joints disposed at each end of the driveshaft, each constant velocity joint comprising:
a plurality of radially elliptical projections spaced about the circumference of the driveshaft and extending radially from an outer surface of the driveshaft; and
an adapter disposed about the plurality of elliptical projections, comprising a plurality of cylindrical interior grooves formed parallel to a longitudinal axis of the adapter, wherein each of the plurality of elliptical projections directly mates with one of the plurality of cylindrical interior grooves.

7. The driveshaft assembly of claim 6, wherein each of the plurality of elliptical projections of the pair of constant velocity joints is flattened at a surface radially distal from the driveshaft.

8. The driveshaft assembly of claim 6, wherein each of the plurality of elliptical projections is surrounded by a variable radius fillet at an intersection between the elliptical projection and the outer surface of the driveshaft.

9. The driveshaft assembly of claim 6, wherein an area of the driveshaft surrounding each of the plurality of elliptical projections is shot peened.

10. The driveshaft assembly of claim 6, wherein a leading face of each of the plurality of elliptical projections is laser hardened.

\* \* \* \* \*